June 7, 1955  S. A. JOHNSON  2,710,325
METHOD AND APPARATUS FOR MAKING ELECTRIC RESISTORS
Filed June 9, 1954  2 Sheets-Sheet 1
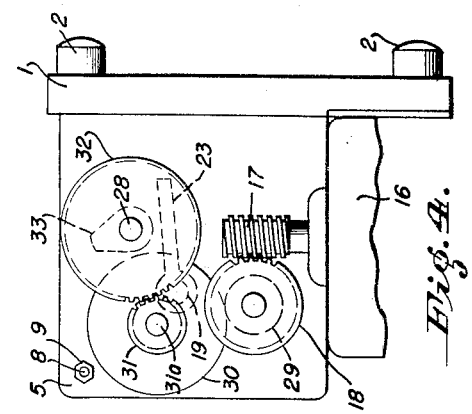
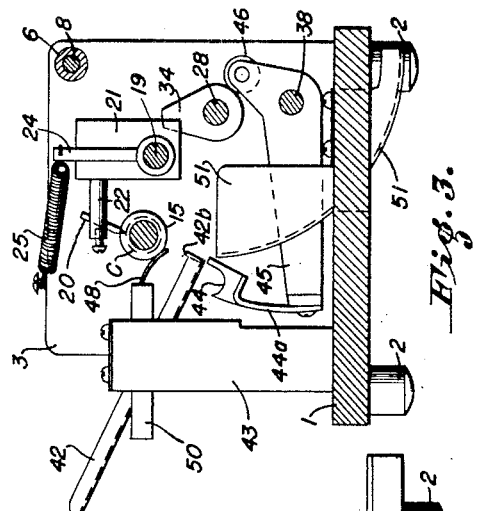
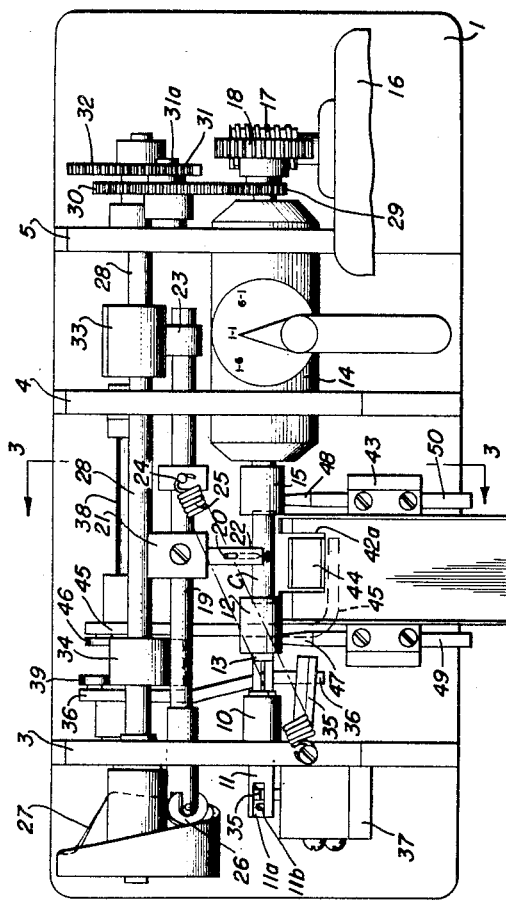
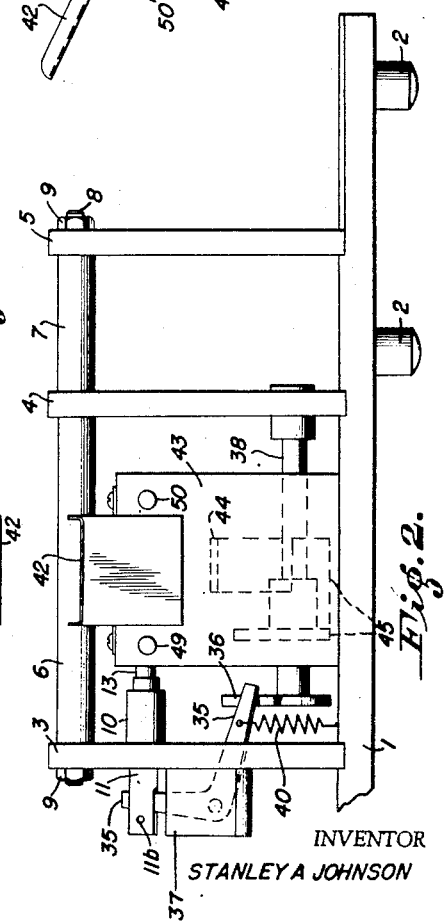
INVENTOR
STANLEY A. JOHNSON
BY Ralph B. Stewart
ATTORNEY June 7, 1955　　　　　S. A. JOHNSON　　　　　2,710,325
METHOD AND APPARATUS FOR MAKING ELECTRIC RESISTORS
Filed June 9, 1954　　　　　　　　　　　　2 Sheets-Sheet 2

INVENTOR
STANLEY A JOHNSON

BY  *Ralph B. Stewart*
ATTORNEY

United States Patent Office 2,710,325
Patented June 7, 1955

2,710,325

METHOD AND APPARATUS FOR MAKING ELECTRIC RESISTORS

Stanley A. Johnson, Brooklyn, N. Y., assignor to Polytechnic Research & Development Company, Inc., Brooklyn, N. Y., a corporation of New York Application June 9, 1954, Serial No. 435,530

9 Claims. (Cl. 201—63)

This invention relates to an improved method of producing electrical resistors and to apparatus for carrying out the improved method.

The invention will be described as applied to the production of resistors of the type comprising a thin metallic film formed on a cylindrical carrier of dielectric material, the resistance value being determined by a spiral groove formed in the metallic film. The invention is especially concerned with forming the groove in the film and is useful for forming grooves in metallic films generally.

In the past it has been customary to form grooves in metallic films by grinding or by electric cutting followed, in some cases, by the application of a protective film to prevent damage to the film from mechanical abrasion, oxidation, etc. The improved method of this invention comprises first forming a suitable protective film over the metallic film before forming the groove, and then electrically cutting through both the protective film and the metallic film to form the groove. The metallic film is thereby protected from damage during handling both prior to the formation of the groove and immediately thereafter, during the period in which films cut in the usual manner would be subject to damage while waiting to have a protective film formed thereon.

One object of the invention is to protect the metallic film from damage due to handling throughout the entire manufacturing process and, further, to employ a method of forming the groove which is capable of being controlled with a high degree of accuracy.

Another object is to provide an improved method of grooving a resistor in which the length of the groove may be controlled automatically and with accuracy.

Still another object is to provide improved apparatus for the production of precision resistors at a relatively high rate and consequent savings in cost.

A further object is to provide apparatus for automatically producing precision resistors from a bulk supply of coated tubular carriers.

A preferred embodiment of the invention is shown in the accompanying drawing, in which:

Figure 1 is a plan view of appartus incorporating the improved method;

Figure 2 is a front elevational view of the apparatus of Figure 1 with some components omitted for the sake of clarity;

Figure 3 is a sectional view along the line 3—3 of Figure 1;

Figure 4 is an end elevational view of Figure 1 from the right;

Figure 5:
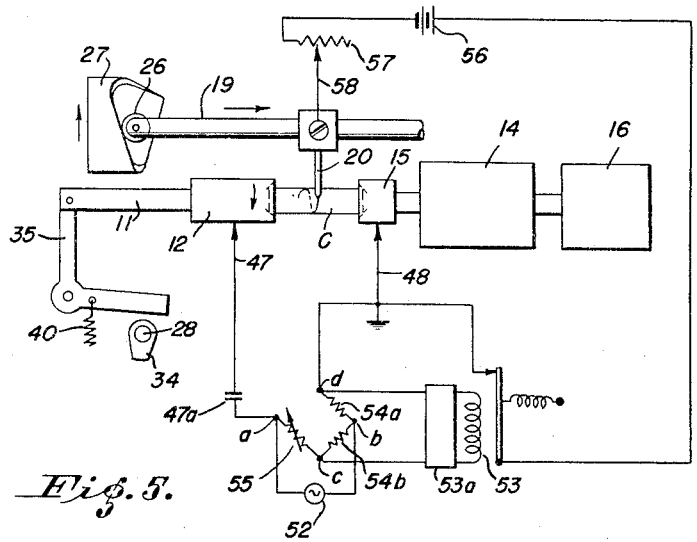
Figure 5 is a schematic diagram of the apparatus of Figure 1 and associated control equipment showing the apparatus in the cutting portion of the operating cycle.
Figure 6:
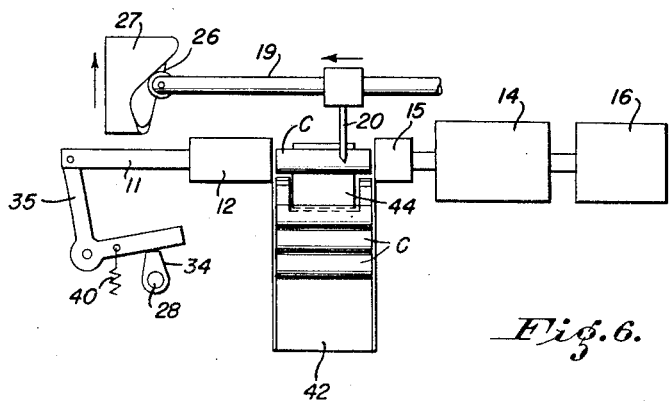
Figure 6 is a schematic diagram of the apparatus in the loading portion of the operating cycle.
Figure 7:
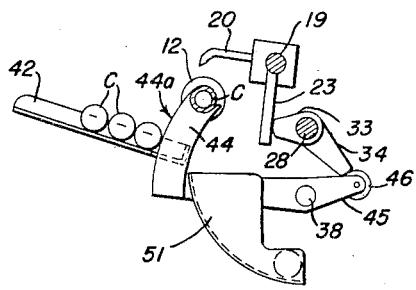
Figure 7 is a second schematic representation of the apparatus in the condition corresponding to that shown in Figure 6.
Figure 8:
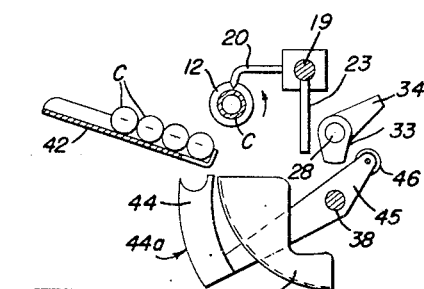
Figure 8 is a second schematic representation of the apparatus in the condition corresponding to that shown in Figure 5.

My improved process for forming spiralled resistors includes three steps, that is, applying a thin metallic film to the surface of a dielectric carrier, applying a protective insulating coating to the metal film, and then forming a groove through both coatings or films by an electric discharge. The first two steps of the process, that is the steps required to form the coated carriers may be performed by the apparatus disclosed in my prior Patent 2,522,272 and according to my prior Patent 2,586,752, but I prefer to form the coated carriers according to my copending application Serial No. 422,169 filed April 9, 1954. The third step of the process, the step of forming the groove in the metallic film and protective coating, is performed by the apparatus shown in the accompanying drawing.

Referring to the drawing, the apparatus comprises a base 1 mounted on legs 2 and having mounted thereon transverse support members 3, 4 and 5. The lower edges of these support members are keyed into the base and the upper edges are tied together by spacers 6 and 7, together with tie rods 8 and nuts 9 (not shown in Figure 1 for sake of clarity). A sleeve 10 is mounted on support member 3 with its axis parallel with base 1 and has journaled therein shaft 11 which can slide axially in the sleeve. A chuck 12 having a conical counterbore in its end face is rotatably mounted on an insulating shaft 13 which terminates one end of shaft 11. Supported by members 4 and 5 is a variable ratio drive 14 having its output shaft aligned with shaft 11 and carrying a chuck 15 which has a conical counterbore in its end face and cooperates with chuck 12 to support a coated carrier C. The other end of the variable ratio drive 14 is driven by means of a motor 16, worm 17 and worm wheel 18.

Mounted to the rear of shaft 11 and variable ratio drive 14, and arranged parallel with shaft 11, is a shaft 19 which is journaled in transverse members 3 and 4 for both rotary and axially sliding movement. A stylus 20 is mounted upon shaft 19 by means of block 21 and arm 22. Mounted near one end of stylus shaft 19 is a downwardly extending stylus-raising arm 23 (Figs. 1 and 4), and mounted on the shaft 19 intermediate block 21 and arm 23 is an upwardly extending arm 24 (Figs. 1 and 3). Spring 25 is attached at one end to arm 24 and at the other end to member 3 in such a fashion as to tend to slide shaft 19 and stylus 20 toward the left end of the apparatus and to rotate the stylus in a downward direction, see Fig. 3. The other end of shaft 19 has a roller 26 mounted thereon which rolls on stylus traverse cam 27 mounted on one end of cam shafts 28 arranged parallel with shaft 19 and journaled in members 3, 4 and 5. Rotation of cam 27 first moves the stylus 20 to the right at a given speed and then allows spring 25 to return the stylus to the left end of its travel at a higher speed.

Cam shaft 28 is driven from the input shaft of the variable ratio drive 14 by means of gear 29 on the input shaft, gear 32 on shaft 28, and intermediate gears 30 and 31 on stub shaft 31a. Cam shaft 28 has mounted thereon a stylus-raising cam 33 located opposite the arm 23, and also a cam 34 for the operation of the mechanism for shifting chuck 12 and the mechanism for loading resistors into the chucks. The chuck 12 is moved axially by means of bell cranks 35 and 36. Bell crank 35 is pivotally mounted on block 37 mounted on transverse member 3 and one arm thereof engages shaft 11 by means of slot 11a and pin 11b. The other arm of bell crank 35 passes through an opening in member 3 and engages one end of bell crank 36 which is pivotally mounted on shaft 38 located below shaft 28. The other arm of bell crank 36 extends upwardly and has mounted thereon roller 39 which rolls on cam 34 secured to shaft 28. The horizontal arm of bell crank 35 is biased in a downward direction by means of spring 40 which has its other end anchored to base 1. It will be seen that rotation of cam 34 causes a cyclic axial movement of shaft 11 and chuck 12 mounted thereon.

A supply of coated carriers C is stored in an inclined chute 42 mounted on an insulating block 43, the chute having a slot 42a formed in the lower end thereof in order to allow passage of feed cradle 44; and portions of the chute on opposite sides of slot 42a are turned up to form stops 42b. Cradle 44 is mounted on the horizontal arm of bell crank 45, which is pivotally mounted on shaft 38, and which has roller 46 mounted on the upper end of its vertical arm in a position to engage cam 34. Rotation of the cam serves to raise and lower cradle 44. The point of contact of roller 46 and cam 34 is angularly displaced in the direction of cam rotation from the point of contact of roller 39 and cam 34 so that chuck 12 is moved to the left (to the open position) before cradle 44 is raised. In moving to open position, chuck 12 releases the carrier clamped between the two chucks, and cradle 44 then transfers another carrier C from chute 42 into position to be clamped between the two chucks when chuck 12 moves into closed position.

A delivery chute 51 is provided beneath the chucks 12 and 15 in a position to receive and carry away finished resistors which have been released by the chucks.

The operation of the apparatus described to this point is as follows: The cycle of operation begins when cam shaft 28 has rotated cam 34 to the point where roller 46 begins to ride up the lobe of the cam 34; bell crank 45 pivots about shaft 38, thus causing cradle 44 to rise and pick up the lowermost resistor from chute 42. The remaining resistors are held in position by arcuate portion 44a of the cradle. Just prior to the lifting of the resistor by the cradle 44, cam 34 has caused chuck 12 to be retracted through the operation of bell crank 35, bell crank 36 and roller 39. Just after cradle 44 has reached the top of its stroke, roller 39 starts to ride down the other side of the lobe of the cam 34 which causes the chuck 12 to again approach chuck 15 to clamp the resistor held by cradle 44 between the two chucks. After this, roller 46 rides down the other side of the lobe of cam 34 and the cradle 44 returns to its original position.

While the resistor is being lifted into position and gripped by chucks 12 and 15, the stylus 20 is being returned from the far end of its stroke by cam 27. During the return portion of its travel the stylus 20 is lifted by means of cam 33 and arm 23. After the resistor has been clamped between chucks 12 and 15, stylus 20 is lowered onto the left end of the resistor and the continued rotation of cam 27 starts it moving toward the right end of the resistor. The stylus 20 continues to move across the surface of the resistor until it has reached the end of its stroke, at which time it is raised by the operation of cam 33 and returned to the left end of its stroke to begin a new cycle. As the stylus is being raised by cam 33, chuck 12 is being moved to the left by cam 34, thus allowing the grooved resistor to drop into chute 51 and placing the apparatus in condition to receive the next resistor to be cut. Since the stylus moves at a uniform velocity at all times during the cutting stroke, the steepness or pitch of the helix cut on the resistor is determined by the ratio of the resistor R. P. M. to the cam shaft R. P. M. and is controlled by variable speed drive 14. The steepness and length of the spiral in turn affect the resistance of the finished resistor.

The length of the spiral groove is controlled electrically by means of a circuit which is sensitive to the resistance value of the resistor. For this purpose an electric circuit is completed through the resistor by brushes 47 and 48 bearing on chucks 12 and 15 and supported by holders 49 and 50, it being understood that chucks 12 and 15 are in electrical contact with the metallic film at the ends of the coated carrier clamped between them. Brush 48 serves to apply cutting potential between the stylus 20 and the end of the resistor engaged by chuck 15.

The cutting and control circuits are shown in Figure 5. The control circuit involves a Wheatstone bridge having four junctions $a$, $b$, $c$ and $d$. A suitable source of alternating current 52 is connected across diagonal points $a$ and $b$. This source preferably is of a frequency of 10 kc./s. but the frequency is not critical. A sensitive, normally open relay 53 is connected to be controlled by the potential across the other two diagonal points $c$ and $d$. The circuit to relay 53 may include an amplifier 53a. Two legs of the bridge comprise suitable fixed resistances 54a and 54b connected between $b$—$d$ and $b$—$c$, respectively. A third leg comprises a variable resistance 55 connected between points $a$—$c$. The fourth leg of the bridge comprises the resistor being spiralled, the resistor being connected to points $a$—$d$ by way of brushes 47 and 48 bearing on chucks 12 and 15. A condenser 47a is included in one connection to resistor C to prevent cutting current from affecting the control bridge. When relay 53 is closed, it connects a source of cutting current such as battery 56 between stylus 20 and chuck 15. This source of cutting current is preferably a direct current source and must have a voltage sufficiently high to cause a dielectric breakdown of the insulating film on the resistor. In practice, it has been found that a range of 20 to 50 volts is sufficient for an application using a protective film of silicon monoxide approximately .00005" thick. The particular voltage to be used will be determined by the IR drop of the uncut resistor blank (the higher voltages being used for high resistance blanks) and on the dielectric strength of the protective film.

The control circuit is adjusted by setting resistance 55 to a value such that with a resistor of the desired value held between chucks 12 and 15, the bridge is substantially balanced and the current through relay 53 is not sufficient to hold it in the closed position. When an unspiralled resistor is gripped by chucks 12 and 15, the bridge is unbalanced sufficiently to cause relay 53 to close. When the point of stylus 20 makes contact with the resistor blank the applied cutting potential breaks down the protective film and starts cutting a groove in the metallic film along a spiral or helical path. As the groove in resistor increases in length, resistance between chucks 12 and 15 becomes greater and greater until the bridge reaches a condition of balance and causes relay 53 to open. This removes cutting potential from the stylus but it continues to skate on the surface of the protective film without damaging either the protective film or the metallic film. Alternating current is used in the bridge circuit to eliminate any effect of the cutting current on the measurement of the value of the resistance.

The arrangement shown in Figure 5 will result in a constantly increasing cutting current as the stylus 20 approaches chuck 15 due to the decrease in resistance of the uncut portion of the resistor film. For the purpose of maintaining a substantialy constant cutting current throughout the entire cutting period, a variable resistor 57 having a total resistance approximately equal to that of the uncut resistor blank is connected in series with stylus 20 and battery 56. A sliding contact 58 mounted to move with the stylus 20 is arranged to vary the value of resistor 57 synchronously with the travel of stylus 20 in such a manner that the total circuit resistance remains substantially constant.

It will be seen that since the cutting operation is terminated electrically by interrupting the cutting current automatically in response to a predetermined value of resistance in the blank being cut, a higher degree of accuracy is obtainable by the use of my improved method than by other methods which are subject to the influence of inertia of comparatively heavy mechanical parts.

No attempt is made to explain the cutting action produced by the electric discharge established between the metallic film and the pointed electrode in contact with the protective layer or film of insulating material. The action is effective to produce a satisfactory groove or cut in the metallic film. The low value of cutting current required for this purpose, and the fact that the current appears to flow intermittently, would suggest that something more is involved than the simple burning away of the metallic film below the point of the stylus. The effectiveness of the cutting action may be due in a substantial degree to the fact that the protective layer or film is quite thin and is deposited upon the metallic film from a vapor state.

It will be apparent to those skilled in the art that many variations from the preferred embodiment described herein are possible without departing from the spirit or scope of the invention.

I claim:

1. A method of forming a spiralled resistor element comprising, applying a thin metallic film to the surface of a cylindrical form of insulating material, applying a protective layer of insulating material over said metallic film, rotating said cylindrical form about its axis, moving a conducting stylus parallel with the axis of said form with the point of the stylus engaging the surface of said layer, and applying an electric potential between said film and said stylus to establish an arc discharge through said layer.

2. A method of forming a grooved resistor element comprising, applying a thin metallic film to the surface of a form of insulating material, applying a protective layer of insulating material over said metallic film, and forming a groove in said film by establishing an arc discharge between said metallic film and a conducting stylus having its point moving in contact with the surface of said protective layer.

3. The method of forming a gap or groove in a metallic film covered by a protective layer of insulating material comprising, moving a conducting stylus over said film with the point of the stylus engaging the surface of said insulating layer and simultaneously applying an electric potential difference between said metallic film and said stylus sufficient to cause a dielectric breakdown of said insulating layer.

4. Apparatus for grooving metallic film resistors comprising, in combination, a conducting stylus and means for moving said stylus over the surface of said film, means applying an electric potential difference between said film and said stylus to form a groove in said film by an arc discharge, a resistance-measuring circuit completed through said film at spaced points thereon, and means controlled by said resistance-measuring circuit for interrupting the potential applied to said stylus when the resistance of said film reaches a predetermined value.

5. Apparatus for spiralling resistors formed of a thin metallic film deposited on a cylindrical dielectric carrier comprising, means for rotating said carrier about its axis, a conducting stylus and means for moving said stylus over the surface of said film parallel with said axis, means applying an electric potential between said film and said stylus to form a groove in said film by an arc discharge established between said stylus and said film, a resistance-measuring circuit completed through said film at the ends of said cylindrical carrier, and means controlled by said resistance-measuring circuit for interrupting the potential applied to said stylus when the resistance of said film reaches a predetermined value.

6. Apparatus for spiralling resistors formed of a thin metallic film deposited on a cylindrical carrier of insulating material comprising, in combination, means for rotating a carrier about its axis, a groove-forming element, means for moving said groove-forming element in repeated cycles from one end of said carrier to the other end and back to said one end, means for moving said groove-forming element away from said carrier during the return stroke of each cycle, and means controlled in timed relation with the operation of said groove-forming element to release a grooved resistor from said rotating means and substitute an ungrooved resistor during the return stroke of said groove-forming element.

7. Apparatus according to claim 6 wherein said groove-forming element comprises a conducting stylus having its point engaging said resistor on its forward stroke, and means for applying an electric potential between said film and said stylus.

8. Apparatus for spiralling resistors formed of a thin metallic film deposited on a cylindrical carrier of insulating material comprising, in combination, means for rotating a carrier about its axis comprising a pair of rotary chucks arranged in alignment, one of said chucks being movable axially thereof from a closed position to an open position, a groove-forming element, means for moving said groove-forming element in repeated cycles from one end of said carrier to the other end and back to said one end, means for moving said groove-forming element away from said carrier during the return stroke of each cycle, and means controlled in timed relation with the operation of said groove-forming element, and being operative during the return movement thereof, for operating said movable chuck from its closed position to open position and back to closed position, a bulk supply of unspiralled resistors, a movable loading element for transferring a resistor from said bulk supply into position between said chuck elements, and means for operating said loading element when said movable chuck is in open position.

9. Apparatus according to claim 8 wherein said bulk supply comprises an inclined chute supporting unspiralled resistors in a stacked relation on an inclined plane, said chute having a notch formed in the lower end thereof, and said movable loading element comprises a cradle normally positioned below the end of said chute and being movable upwardly through said notch to elevate the lowermost resistor in said chute into position between said chucks.

No references cited.